May 28, 1968   J. F. THOMAS ET AL   3,385,619
FLY LINE AND METHOD AND MEANS FOR JOINING A LEADER THERETO
Filed Aug. 19, 1966
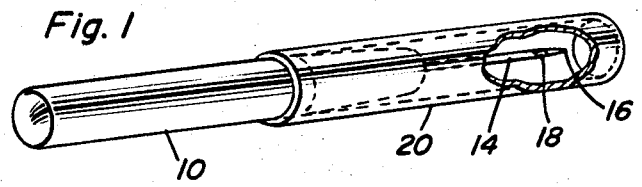
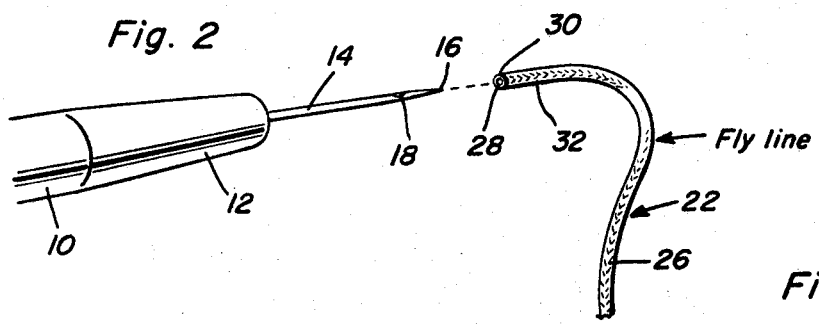
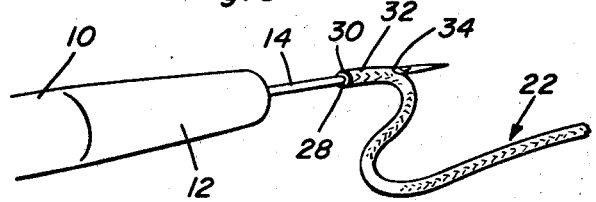
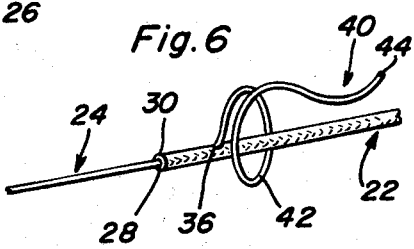
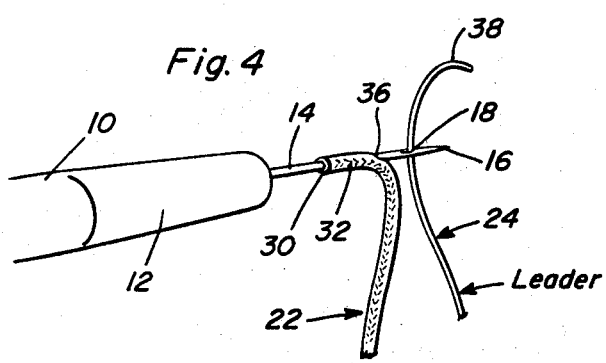
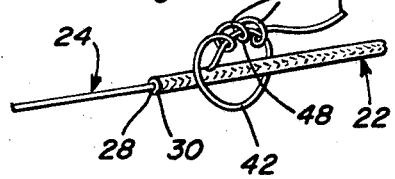
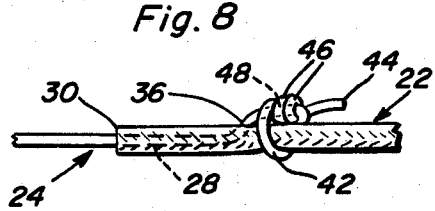
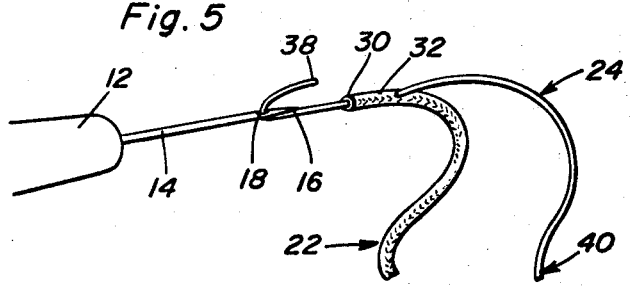
John F. Thomas
Dennis J. Vish
INVENTORS.

United States Patent Office 3,385,619
Patented May 28, 1968

3,385,619
FLY LINE AND METHOD AND MEANS FOR
JOINING A LEADER THERETO
John F. Thomas, Wexford, Pa. (458 McKnight Circle,
Pittsburgh, Pa. 15237), and Dennis J. Vish, 12 Airlane Drive, R.D. 3, Coraopolis, Pa. 15108
Filed Aug. 19, 1966, Ser. No. 573,681
6 Claims. (Cl. 289—1.2)

This invention relates to a fishing line, more particularly, to a fly line, a monofilament leader, and a method and means for manually fabricating an improved splice or joint between the interconnected ends of the fly line and leader, respectively.

As will be hereinafter more fully set forth and clarified, the essence of the inventive concept has to do with the splice or joint and practical easy-to-follow sequential steps which, when correctly followed, function to provide a knotless joint whose junction-point-identity is hardly noticeable. Accordingly, the overall line is virtually tangle-proof, can be reeled in or cast and payed out without hindrance and smoothly handled with pleasing efficiency.

The fly line is designed and adapted to function for casting artificial flies and, as is usual, is floatable, of predetermined weight and cross-sectional gauge and is characterized by a waterproof nylon or equivalent slick-surfaced buoyant coating. Also, as is customary, it is hollow or tubular. The leader is of a relatively thin or small gauge compared to the stout cross-section of the hollow fly line. Therefore, it can be considered that the fly line itself and also the leader is of a conventional type. Anglers and others conversant with the use of fly lines and artificial flies are well aware of the desire to provide an adaptation which is free of the customary bulky and objectionable knot which is present when the connectible ends of the fly line and leader are knotted together.

The many objections and difficulties encountered are well known to fishermen and are set forth to some extent in the explanatory information contained in Allen's Fly Line Terminal Anchor Patent 2,712,196.

To an extent the Allen patent may be cited here as exemplary of the state of the art to which the present invention relates in that it reveals a leader and line joint or connection but which unlike the invention herein revealed has to do with a rigid wire element which has a straight shank with an eye at one end and wherein the shank has a spear point at the other end with special prongs and which is fitted and anchored in the axial bore or central portion of the fly line whereby to thus provide an anchor for attachment of the knotted end of the leader through the eye of the shank. To be sure, other and various ways of adapting a fly line for adequate attachment of a leader thereto have been devised by others with a view toward advancing this line of endeavor but need not, it is submitted, be specifically referred to here.

An object of the present venture is to provide an improved solution of the long unsolved problem of satisfactorily uniting adjacent coacting ends of a fly line and a monofilament or equivalent leader.

Insofar as the ready-to-use fly line and leader combination is concerned the present concept has to do, briefly stated, with a relatively stout hollow buoyant fly line which is unique in that a limited bendable end portion of the pliant flimsy line is provided with a prepared or punctured orifice. This orifice communicates with the hollow portion or bore of the terminal end of the fly line, that is outwardly beyond the orifice. With this arrangement a conventional leader has one end portion, say the trailing end portion, threaded telescopingly into the cooperating hollow bore of the inlet end portion of the fly line. It is then passed or threaded through and outwardly beyond the orifice and a sufficient end portion is available so that said end portion is capable of being tied to the apertured end portion of the fly line by way of a noose-like loop whereby to thus provide a strong and durable splice or joint which is substantially knotless and is therefore not objectionable.

Further, and as will also be hereinafter set forth, the procedural steps which are resorted to in carrying out the principles of the overall concept are deemed to be novel. Then, too, and with the new and improved result in mind, a simple and practical awl-like implement or tool is provided so that the splicing or jointing job can be successfully resorted to and carried out at the fishing ground, at home, or perhaps while en route if so desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of the awl-like needle-equipped safeguarded implement which is herein provided for use in carrying out preliminary method steps, a portion of the cover being broken away to show the needle.

FIG. 2 is a view in perspective showing the first or initial method step wherein the pointed end of the needle is lined up with the hollow or bore of the bent end of the fly line.

FIG. 3 is a view similar to FIG. 2 and showing the completion of the first step, that is, wherein the pointed eye-equipped end of the needle has been caused to penetrate the bend of the bent end portion.

FIG. 4 is also a view in perspective showing the next or second step namely, manually threading a free terminal leading end portion of the leader through the eye.

FIG. 5 is a view also in perspective which shows the next sequential or succeeding step wherein the leading end portion of the leader (at the left in FIG. 5) has been drawn through and beyond the terminal end of the fly line after the needle has been withdrawn from the bore.

FIG. 6 is a view in perspective (the implement now no longer in use) wherein the overall leading or left hand portion of the leader has been pulled through (not detailed) and wherein the trailing end of the leader is being formed into a noose-like encircling loop.

FIG. 7 is a view similar to FIG. 6 showing the completed loop and showing several windings wherein the windings or coils are wrapped around a coacting portion of the loop preparatory to completing the loop tautening and joint completing step.

And FIG. 8 is a view on an enlarged scale wherein, for purposes of clearness, the terminal end of the leader is completely tied after having pulled the leader tightly relative to the coacting end portion of the fly line.

With reference first to the tool or implement which is designed and adapted for use in carrying out the method steps illustrated in FIGS. 2 to 5 it will be seen that it is constructed as shown in FIG. 1. The implement comprises a simple awl which embodies an appropriate handle or grip 10 having a blunt-ended tapered portion 12 provided with an axially aligned needle whose shank is denoted at 14 and which terminates in a pointed end 16 and is provided with an eye 18. In practice, an appropriate protective cap 20 is provided and is fitted over and encloses and guards the needle as shown in FIG. 1.

With reference now to the fly line this is denoted by the numeral 22 while the monofilament or equivalent small-gauge leader is denoted at 24. The fly line is of any pliant buoyant and floatable construction and of suitable stoutness and length. In the instant matter the body portion of the fly line is denoted at 26 and the same is of tubular or hollow construction, the bore being denoted at 28, said bore opening through the needle inlet end portion 30. This end portion is here further differentiated by the numeral 32 and is referred to as a bent end portion as perhaps best shown in FIGS. 3 to 5. In carrying out the initial or primary step (see FIGS. 2 and 3) the pointed end of the needle is lined up with the bore 28 and the eye-equipped pointed end is forcibly pressed through the bore whereby it is caused to penetrate the bend 34 in a manner to define and provide an orifice or aperture 36. Thus, the first step presents the eye-equipped end of the needle for the attachment thereto of what may be called the leading end portion 38 of the monofilament leader 24. With reference therefore to the second step this consists in manually threading the free terminal leading end portion of the leader 38 through the eye 18 and thus connecting this end portion to the needle sufficiently that the next and third step of FIG. 5 can be satisfactorily carried out. This third step consists in pulling the needle and the attached portion of the leader by hand through the bore and completely withdrawing the needle from the bore and slidably threading the leader through and beyond the entrance end 30 and bore 28 in the manner adequately shown in FIG. 5. Once the end 38 is available it can be caught hold of with the fingers of one hand and the apertured bent portion of the fly line can be held with the fingers of the other hand and the major portion of the leader can be drawn through the bore until the terminal end portion which is denoted generally at 40 (FIG. 6) comes into play. The portion 40 is then formed into at least one encircling loop 42, this loop being adjacent to the pull-through orifice 36. Having fashioned the loop, the terminal end portion 44 is now wrapped, coiled or wound as denoted at 46 around the coacting portion 48 of the loop, all as shown in FIG. 7. This looping, coiling and in fact final tautening and tying step can be considered either as progressive sequential actions or as a single looping and tying step as the case may be. In either event, it will be evident that the leader is pulled lengthwise relative to the lengthwise dimension of the fly line until the noose tightens and the coils are bound securely around and constitute a retaining component of the noose. Actually FIG. 8 has been drawn to emphasize the component parts and to illustrate the end tying result but in practice the final retaining tie is hardly noticeable.

It is believed that the herein disclosed inventive concept well serves the purposes for which it is intended, that the tool or implement, the procedural steps, and the ready-to-use fishing line will be understood after having considered the views of the drawing and the explanatory specification. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The method of making a veritably knotless splice between axially alignable and connectible end portions of (1) a stout tubular buoyant fly line of a predetermined cross-sectional gauge and (2) a relatively thin fine-gauge monofilament or an equivalent leader: said method capable of being systematically carried out in a feasible step-by-step manner and wherein (A) the first step consists in lining up and axially inserting the leading apertured end of an awl-type needle into a terminal end of the bore of an angularly bent fly line and forcibly pressing and passing the leading end portion of said needle through the bore of the bent portion in a manner to cause the pointed end to puncture the bend of the fly line and to thus project and expose the needle's eye beyond the bend and simultaneously define and provide a leader inlet and piloting orifice capable of communicating with that portion of the bore in which the needle is then lodged (B) the second step, manually threading a free terminal leading end portion of said leader through said eye (C) the third step, pulling the needle and the attached portion of the leader by hand through the bore and completely withdrawing the needle from the bore and slidably threading the leader through and beyond the entrance end of said bore and then (D) securely tying the trailing end portion of the leader to the coacting punctured but intact end portion of said fly line.

2. The method steps set forth in claim 1, and wherein while performing said first step said bent portion is clenched and held between the thumb and fingers of one hand, say the left hand, and said awl-equipped needle is held in the right hand and the pointed end is aimed toward the bend of the bent portion and pressed from right to left relative to and while holding said bent portion steady so that the point of the needle pierces the bend to uncover and expose the eye, whereby to thus locate the eye and to ready the eye for carrying out said second leader threading, attaching and sliding step.

3. The method steps according to claim 2, and wherein that portion of the leading end which is threaded through the needle's eye is ample in length to stay put and thus maintain its temporary attachment to the needle while hand-pulling and withdrawing the needle and completing the step of pulling the leading end through the bore of the bent portion and beyond the free terminal end of the bore so that it can be amply accessibly exposed and caught hold of in a manner to slide the leader on through and beyond the terminal of said bore until the trailing end portion is available for and accordingly readied to pursue and carry out the tying and final splice completing step.

4. The method steps according to claim 3, and wherein said trailing end portion is left amply long that it is capable of being looped once around the fly line at a point proximal to the puncture, after which the terminal portion is twisted around a companion portion of the loop and the latter is then drawn and bound tightly and thus fastened in place to complete the splice.

5. In combination, a relatively stout hollow buoyant fly line having a free terminal inlet end portion, a relatively thin leader having an end portion threaded telescopingly into the cooperating hollow bore of said inlet end portion, then through and outwardly beyond an orifice provided therefor at a point spaced from the free inlet end of said bore, and that end portion of said leader inwardly of said orifice being tied and thus joined to the coacting end portion of said leader adjacent said orifice.

6. The combination according to claim 5, and wherein the end portion of the leader which is inwardly of said leader is free and of a length that it can be and is looped at least once to provide a contractible noose around the oriented portion of the fly line, and also wherein the end portion which is joined to said noose-type loop is coiled and wrapped tightly around a complemental part of the loop, whereby when the leader is pulled relative to the fly line the loop and wrapped coils thereon are conjointly snubbed, tautened, and securely bound in a manner to thus splice and join the fly line and leader together.

References Cited

UNITED STATES PATENTS

| | | | |
|---|---|---|---|
| 330,087 | 11/1885 | Binns | 298—1.2 X |
| 2,600,395 | 6/1952 | Domoj et al. | 289—1.2 X |
| 2,698,986 | 1/1955 | Brown | 289—1.2 |
| 2,740,185 | 4/1956 | Silver | 289—1.2 |

LOUIS K. RIMRODT, *Primary Examiner.*